US011770009B2

(12) United States Patent
Moriyama (10) Patent No.: US 11,770,009 B2
(45) Date of Patent: Sep. 26, 2023

(54) POWER SOURCE APPARATUS AND A SYSTEM

(71) Applicant: CANON KABUSHIKI KAISHA, Tokyo (JP)

(72) Inventor: Takumi Moriyama, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 282 days.

(21) Appl. No.: 17/123,256

(22) Filed: Dec. 16, 2020

(65) Prior Publication Data

US 2021/0194251 A1    Jun. 24, 2021

(30) Foreign Application Priority Data

Dec. 20, 2019   (JP) .................... 2019-229922

(51) Int. Cl.
*H02J 3/46* (2006.01)
*H02M 5/293* (2006.01)
*B41J 2/045* (2006.01)
*G03G 15/00* (2006.01)

(52) U.S. Cl.
CPC ............ *H02J 3/472* (2020.01); *H02M 5/293* (2013.01); *B41J 2/0457* (2013.01); *G03G 15/80* (2013.01)

(58) Field of Classification Search
CPC .... H02J 3/472; H02M 5/293; H02M 3/33523; H02M 1/008; H02M 1/0006; H02M 1/007; B41J 2/0457
See application file for complete search history.

(56) References Cited

U.S. PATENT DOCUMENTS

2018/0358889 A1* 12/2018 Moriyama ............. H02M 1/36

FOREIGN PATENT DOCUMENTS

JP      2009-055686 A     3/2009

OTHER PUBLICATIONS

Co-pending U.S. Appl. No. 17/130,095, filed Dec. 22, 2020.

* cited by examiner

*Primary Examiner* — Elim Ortiz
(74) *Attorney, Agent, or Firm* — Venable LLP (57) ABSTRACT

A power source apparatus includes a plurality of first power sources, each connected to a load through a power supply line, and at least one second power source, which is a sub power source to be used when the first power source is unable to output a predetermined voltage. The second power source is connected in parallel to the power supply line of at least one of the first power source through a diode. The second power source is provided on an anode side of the diode, the load is configured to operate at a voltage equal to or more than a first voltage, the first power source outputs a second voltage higher than the first voltage, the second power source outputs a third voltage, which is higher than the first voltage, the voltage output through the diode from the second power source being lower than the second voltage.

12 Claims, 4 Drawing Sheets

POWER SOURCE APPARATUS AND A SYSTEM

BACKGROUND OF THE INVENTION

Field of the Invention

The present disclosure relates to a power source apparatus having a plurality of power sources.

Description of the Related Art

An electric device is connected to, for supplying power to its load, a power source apparatus or is provided with a built-in type power source. There is known a power source apparatus having a plurality of DC power sources, for example, an AC/DC power source which converts an AC voltage into a DC voltage. The AC/DC power source rectifies an AC voltage from a commercial power source through a diode bridge, and further performs smoothing through a smoothing capacitor. After that, the smoothed voltage is charged to a capacitor provided on a secondary side through a transformer to generate a DC voltage. The secondary side is equipped with a circuit which detects an output voltage of the AC/DC power source. The circuit controls a current flowing through the transformer by driving a switching element connected to a primary side of the transformer so that the output voltage becomes a predetermined value.

Further, in some electric devices, a DC/DC power source, which converts a DC voltage generated by an AC/DC power source into a DC voltage having another voltage value, is provided. Hereinafter, the AC/DC power source and the like will be simply referred to as a power source.

Generally, a power (i.e., rated power) which is allowed to be output by a power source is determined when it is designed. Therefore, a single power source may be insufficient to supply the power required for electric equipment to operate. In this case, the electric equipment is provided with a plurality of power sources.

In electric equipment provided with a plurality of power sources, in a case where outputs of the power sources are connected in parallel, the output current of the power source which has the largest output voltage may become the largest due to variations in the output voltages of the power sources. As a result, even though a plurality of power sources are provided, an output power of one power source becomes large, and the output power may exceed the rated power.

In order to prevent such a situation, there is known a configuration in which a load of the electric equipment is individually divided according to the rated power of the power source so that only one power source is connected to each load. However, the power source may fail due to an external electrical surge or a component failure. In a configuration in which a single power source is connected to a respective single load, when a particular power source fails, the load connected to the power source becomes inoperable. As a result, in the electric equipment having a plurality of power sources, as the number of power sources increases, the electric equipment connected to the power source tends to operate abnormally.

Japanese Patent No. 5088049 discloses electric equipment which is provided with, as a power source, a plurality of AC/DC power source and a single sub power source. In this electric equipment, an output voltage of each of the AC/DC power source is detected. In a case where the output voltage of the AC/DC power source drops due to a failure or the like, the sub power source is operated, and the sub power source and a load are connected with a switch. With this configuration, even if the AC/DC power source fails, instead of the failed AC/DC power source, the sub power source can supply power to the load.

However, in the configuration disclosed in Japanese Patent No. 5088049, since the sub power source and the load are connected with a switch, such as a semiconductor switch, the size and the cost of the substrate is increased due to the increased number of parts. Further, in the method disclosed in Japanese Patent No. 5088049, an operation of the sub power source is started in response to a detection of a decrease in the output voltage of the AC/DC power source. Therefore, the operation of the load may be stopped due to the occurrence of a period during which power is not supplied to the load.

SUMMARY OF THE INVENTION

A power source apparatus according to the present disclosure includes a plurality of first power sources, each connected to a load through a power supply line, and at least one second power source, which is a sub power source to be used in a case where the first power source is unable to output a predetermined voltage, wherein: the second power source is connected in parallel to the power supply line of at least one of the first power source through a diode, the second power source is provided on an anode side of the diode; the load is configured to operate at a voltage equal to or more than a first voltage; and the first power source outputs a second voltage higher than the first voltage; the second power source outputs a third voltage, which is higher than the first voltage, the voltage output through the diode from the second power source being lower than the second voltage, thereby, when the voltage output from the first power source becomes lower than the voltage output through the diode from the second power source, the diode conducts and power is supplied from the second power source to the load.

Further features of the present invention will become apparent from the following description of exemplary embodiments (with reference to the attached drawings).

DESCRIPTION OF THE EMBODIMENTS

Hereinafter, an embodiment of the present disclosure is explained in detail with reference to drawings.

First Embodiment

Figure 1:
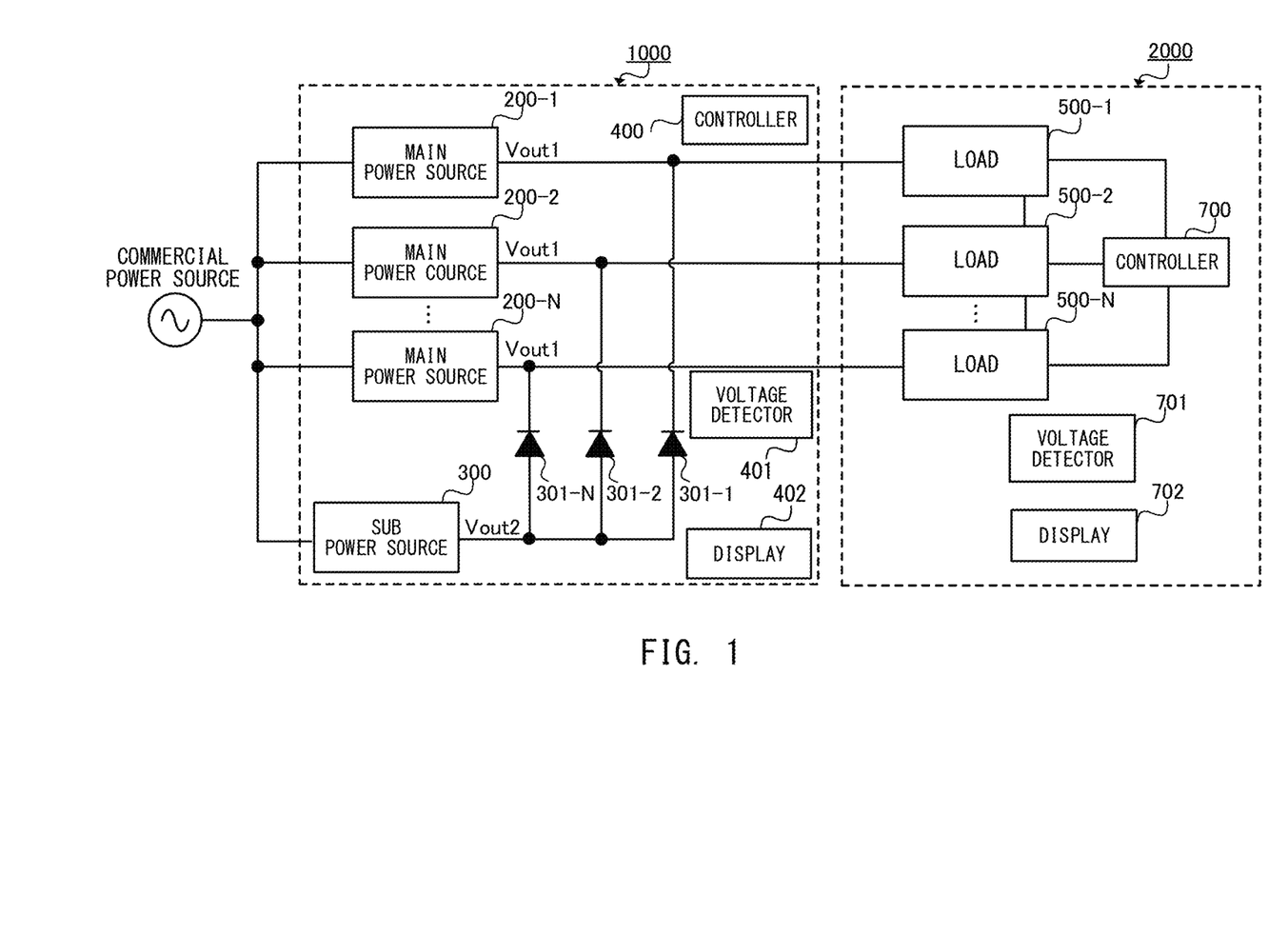
FIG. 1 is a schematic diagram of a power source apparatus and electric equipment according to at least one embodiment of the present disclosure.

FIG. 1 is a schematic diagram of an exemplary system configuration having a power source apparatus 1000 and electric equipment 2000 according to the present disclosure. The power source apparatus 1000 shown in FIG. 1 includes at least one of main power sources 200 (200-1 to 200-N) and one sub power source 300. The sub power source 300 is a power source used in a case where the main power source 200 cannot output a predetermined voltage. Further, the power source apparatus 1000 and the electric equipment 2000 form an image forming apparatus which forms an image on a sheet, for example.

The electric equipment 2000 includes two or more loads 500 (500-1 to 500-N), which are respectively separate load, and includes a controller 700 which controls these loads 500. The load 500 includes at least one of a motor in the image forming apparatus and a high voltage generating circuit. Each of the main power source 200 and the sub power source 300 is an AC/DC power source which converts AC voltage to DC voltage, and functions as a direct-current power source which outputs direct-current voltage. Moreover, a voltage detector 701 and a display 702 are provided in the electric equipment 2000. The configuration of the power source apparatus 1000 and the electric equipment 2000 may be defined arbitrarily. For example, the power source apparatus 1000 and the electric equipment 2000 may be separately provided. Alternatively, the power source apparatus 1000 may be built in the electric equipment 2000.

The main power sources 200-1, 200-2, . . . 200-N are connected to corresponding load 500-1, 500-2, . . . 500-N through the electric power supply line, respectively. Thus, the outputs of the main power source 200-1 to 200-N are not connected to each other. Although each of the rated power of the main power source 200-1 to 200-N does not need to be the same, a target output voltage of each output voltage Vout1 is set to an identical voltage value.

The sub power source 300 is connected, through a diode 301-1, in parallel to a power supply line which connects the main power source 200-1 and the load 500-1. The sub power source 300 is provided on an anode side of the diode 301. The same applies to the other main power sources 200-2, . . . 200-N, load 500-2, . . . 500-N, diode 301-2, . . . 301-N.

The voltage detector 701 detects a voltage value of each of loads 500-1, 500-2, . . . 500-N. The controller 700 monitors voltage values detected by the voltage detector 701 and determines whether or not a failure has occurred. In a case where it is determined that a failure has occurred due to, for example, the detection of an abnormal voltage value in at least one of the loads 500-1, 500-2, . . . 500-N, which indicates an occurrence of failure, or due to any other reason, information indicating the occurrence of the failure and information identifying the load in which the failure has occurred is displayed in the display 702. In FIG. 1, the voltage detector 701 is provided in the electric equipment 2000 separately from the load 500, however, the voltage detector may be individually provided to each of the loads 500-1, 500-2, . . . 500-N.

A controller 400, a voltage detector 401, and a display 402 are provided in the power source apparatus 1000. The voltage detector 401 detects a voltage value output from each of the main power sources 200-1, 200-2, . . . 200-N. The controller 400 monitors the voltage value detected by the voltage detector 401 and determines whether a failure has occurred in the main power source 200 or not from the detection result. In a case where it is determined that a failure has occurred in at least one of the main power sources 200-1, 200-2, . . . 200-N by detecting an output unusual voltage value, the occurrence of the failure and the information specifying the main power source 200 in which the failure has occurred are displayed on the display 402. In FIG. 1, the voltage detector 401 is provided in the power source apparatus 1000 separately from the main power source 200. However, the voltage detector may be individually provided corresponding to each of the main power sources 200-1, 200-2, . . . 200-N.

Figure 2:
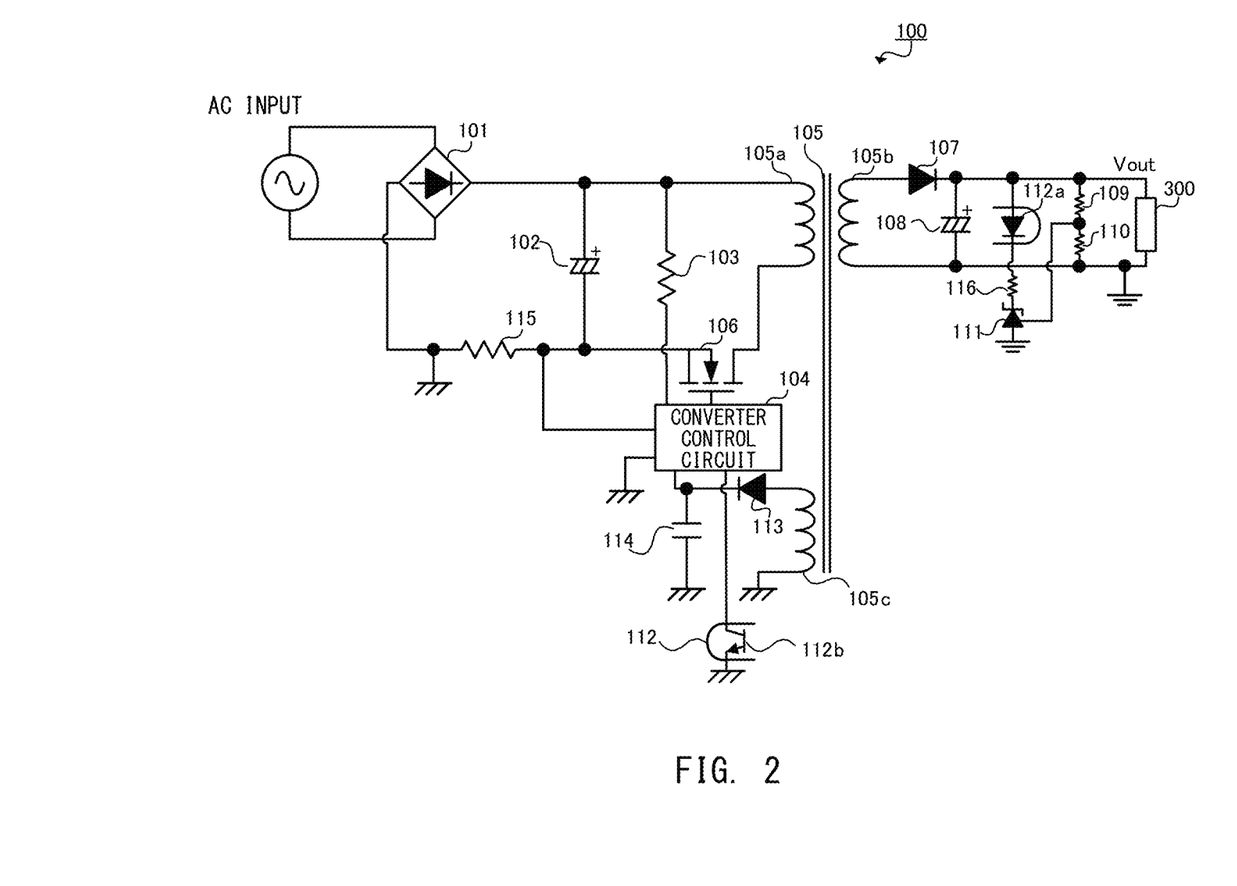
FIG. 2 is a schematic circuit diagram illustrating an exemplary AC/DC power source.

Next, configuration and operation of the AC/DC power source 100 are explained with reference to FIG. 2. The AC/DC power source 100 corresponds to the main power source 200 and the sub power source 300 of FIG. 1. The AC current input into the AC/DC power source 100 is rectified by the diode bridge 101, which is an example of a rectifier, and the rectified output is input to a smoothing capacitor 102 to charge the same. Thereby, DC voltage appears across both ends of the smoothing capacitor 102. The DC voltage is supplied as a power source voltage of a converter control circuit 104 through a starting resistor 103. The converter control circuit 104 starts outputting the switching signal of a switching element 106 which is connected in series to the transformer 105. Alternative current flows in a primary winding 105a of a transformer 105, which is arranged at the subsequent side of smoothing capacitor 102 due to this switching. The converter control circuit 104 is grounded through a resistor 115.

Due to the alternative current, voltage occurs at a secondary winding 105b according to the winding ratio of the transformer 105. A secondary side rectification diode 107 and a secondary side smoothing capacitor 108 are arranged at a secondary side of the AC/DC power source 100. The voltage generated in the secondary winding 105b of the transformer is rectified by the secondary side rectification diode 107 and is smoothed by the secondary side smoothing capacitor 108. As a result, DC voltage is obtained from both ends of the secondary side smoothing capacitor 108. The voltage obtained from both ends of the secondary side smoothing capacitor 108 is the output voltage Vout of the AC/DC power source 100. In order to stabilize the output voltage Vout to a predetermined target voltage, the voltage divided by voltage detection resistors 109 and 110 is fed back to the converter control circuit 104 through a shunt regulator 111 and a photocoupler 112.

The output voltage Vout is divided by the voltage detection resistors 109 and 110, and is input to the shunt regulator 111. The shunt regulator 111 compares the divided voltage input with a reference voltage inside the shunt regulator 111 and increases the current flowing through a light emitting diode 112a in a case where the input voltage is higher than the reference voltage. The shunt regulator 111 reduces the current flowing through the light emitting diode 112a in a case where the input voltage is lower than the reference voltage. When current flows, the light emitting diode 112a emits light with an amount of light corresponding to an amount of current, and a phototransistor 112b is turned on in an electrically insulated state (the light emitting diode 112a and the phototransistor 112b are provided in the same package to constitute the photocoupler 112).

As a result, the output voltage Vout of the AC/DC power source 100 is fed back to the converter control circuit 104 through the photocoupler 112. The converter control circuit 104 controls the duty ratio of the switching element 106 so that the output voltage Vout of the AC/DC power source 100 becomes a constant value.

For example, in a case where the output voltage Vout of the AC/DC power source 100 drops, it is necessary to supply more power to the secondary side of the transformer 105, therefore, an amount of time in which the switching element 106 is "ON" is increased, and the current flowing in the primary winding 105a of the transformer is increased accordingly. Further, an auxiliary winding 105c is wound around the same core as the primary winding 105a and the secondary winding 105b of the transformer, and when the switching of the switching element 106 is started, the voltage also appears in the auxiliary winding 105c. Since this voltage causes current to flow through the diode 113 to charge a capacitor 114, DC voltage is obtained across both ends of the capacitor 114.

The voltage of the capacitor 114 serves as a power source for the converter control circuit 104. The converter control circuit 104 controls an operation in the converter control circuit 104 so that the power supplied to the converter control circuit 104, which has been continuously supplied from the smoothing capacitor 102 through the starting resistor 103, is cut off inside the converter control circuit 104.

Both the main power source 200 and the sub power source 300 in FIG. 1 correspond to the AC/DC power source 100, however, their output voltages differ from each other. Hereinafter, a steady-state output voltage value of the main power source 200 will be referred to as V1, and a steady-state output voltage value of the sub power source 300 will be referred to as V2. The value of V2 is determined such that the voltage output from the sub power source 300 through the diode 301 (hereinafter, referred to as V3) is lower than the output voltage value V1 of the main power source 200. Therefore, V1 and V2 have different values. Further, in the steady state, the output voltage value of the sub power source 300 is V2, however, the voltage value output through the diode 301 becomes a value smaller than the voltage value V2 due to the voltage drop in the diode 301. Therefore, the relationship of V1>V3 and V2>V3 is established. Thus, in the first embodiment, the sub power source 300 and the main power source 200 have basically the same configuration, however, the values of the voltage detection resistors 109 and 110 of the sub power source 300 and the values of the voltage detection resistors 109 and 110 of the main power source 200 are different from each other.

Figure 3A:
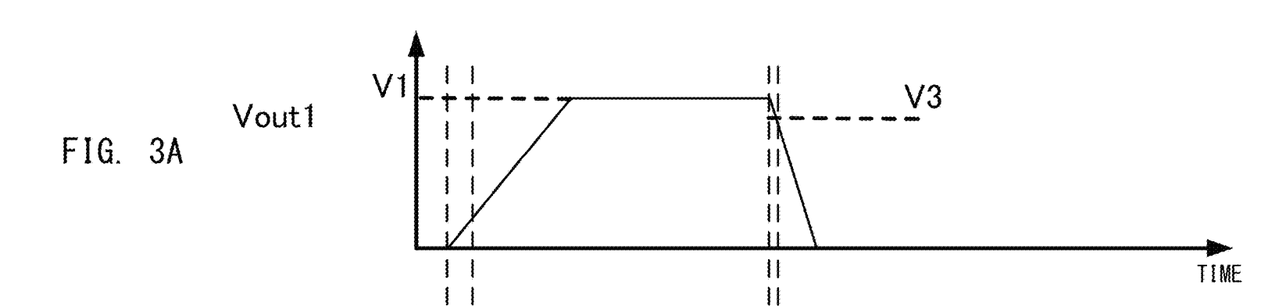
FIG. 3A, FIG. 3B, and FIG. 3C are graphs each representing voltage change in an output voltage with respect to time.
Figure 3B:
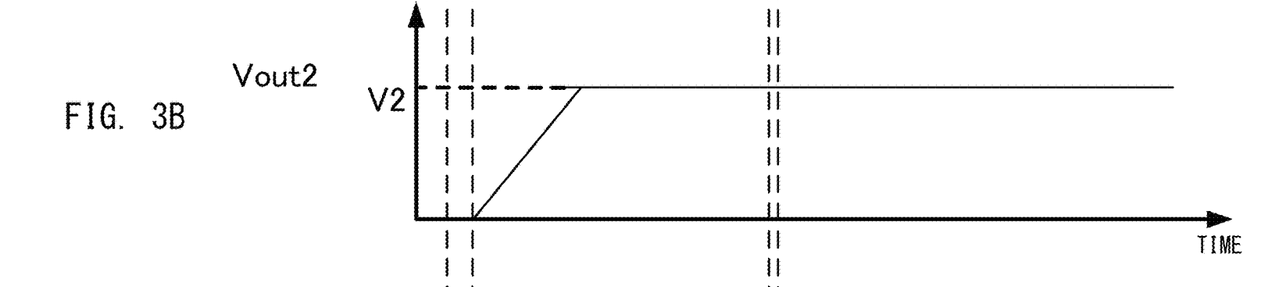
Figure 3C:
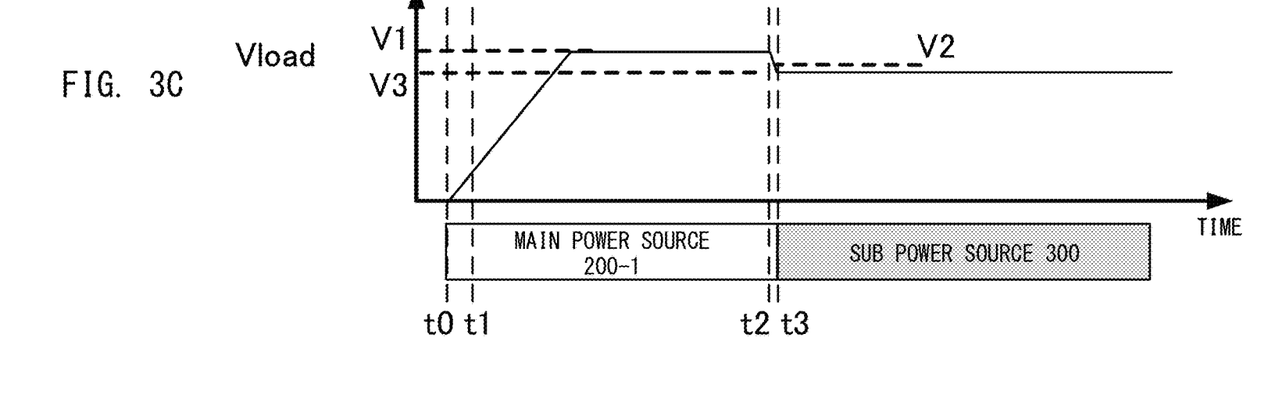

The operation of the power source apparatus 1000 of the first embodiment will be described with reference to FIG. 3A, FIG. 3B and FIG. 3C. In these figures, the horizontal axis represents time t and the vertical axis represents voltage. FIG. 3A represents the change in the output voltage Vout1 of the main power source 200-1 over time, FIG. 3B represents the change in the output voltage Vout2 of the sub power source 300 over time and FIG. 3C represents the change in the voltage Vload supplied to the load 500-1 over time.

Then, the operation of the power source apparatus 1000 in a normal state in which the main power source 200 has not failed will be described. When a voltage of the commercial power source is input to the power source apparatus 1000 at time t0, the main power source 200 and the sub power source 300 begins to operate. In the first embodiment, there is a time lag between a startup time of the main power source 200 and that of the sub power source 300. The main power source 200 is activated at time t0, while the sub power source 300 is activated at time t1 after time t0. In the first embodiment, the activation of the main power source 200 and that of the sub power source 300 is controlled by the controller 400.

Here, the sub power source 300 is activated earlier than the main power source 200 and the output voltage Vout2 of the sub power source 300 exceeds the output voltage Vout1 of the main power source 200, the diode 301 shown in FIG. 1 is changed to a conductive state. As a result, power is supplied from the sub power source 300 to all the loads 500 and a large amount of current flows from the sub power source 300, thus, an overcurrent protection function of the sub power source 300 may operate to stop the operations of the power source apparatus 1000 and the electric equipment 2000.

In order to prevent this, the output voltage Vout2 of the sub power source 300 needs to be lower than the output voltage Vout1 of the main power source 200 both at the startup time and in the steady state of the power source apparatus 1000. Therefore, the controller 400 activates the sub power source 300 and then activates the sub power source 300 to provide a time difference between the startup times of them so that the relationship of Vout1>Vout2 is satisfied.

Referring to FIG. 3A, FIG. 3B and FIG. 3C, in FIG. 3A, the output voltage of the main power source 200 starts to rise at time t0, and when it reaches V1, its voltage value is maintained at V1. In the normal state, the voltage value of Vout1 is maintained at V1, however, as will be described later, when a failure occurs in the main power source 200 at time t2, Vout1 drops to 0V.

On the other hand, in FIG. 3B shows that the output voltage Vout2 of the sub power source 300 starts to rise at time t1, and when it reaches V2 described above, its voltage value is maintained at V2. As described above, in the normal state, the output voltage Vout2 of the sub power source 300 is maintained at V2. In an alternative embodiment, the startup times of the main power source 200 and the sub power source 300 are set to be the same, while slew rates, at a voltage rise, of the sources are set to be different from each other so that the relationship of Vout1>Vout2 is satisfied. Therefore, with respect to the main power source 200 and the sub power source 300, the relationship of Vout1>Vout2 is always satisfied in the transition state from the state where the voltage is zero (before activation) to the state where the voltage reaches V1 or V2, respectively.

FIG. 3C shows the voltage supplied to the load 500-1. In a case where the main power source 200 is in the normal state, the voltage V1 is supplied to the load from the main power source 200. On the other hand, the output voltage value of the sub power source 300 is V2. However, it is V3, which is the voltage value after the voltage drop due to the diode 301, that is supplied to the load, as described in the above. Since V1>V3 and the sub power source 300 is provided on an anode side of the diode 301, the diode 301 is not in a conductive state, therefore, the output voltage Vout2 of the sub power source 300 is cut off, and the output voltage Vout1 of the main power source 200 is supplied to the load 500-1.

After the activation of the main power source 200 and the sub power source 300, since the main power source 200 has not failed, the power is supplied from the main power source 200 to the load 500. At this point, the sub power source 300 is also activated, however, as described above, the voltage value V3, which is output from the sub power source 300 through the diode 301 after the power is activated, is lower than the voltage value V1 output from the main power source 200. Therefore, the diode 301 is not in the conductive state. Thus, the sub power source 300 does not supply any power to the load 500. As a result, in a case where the main power source 200 is in the normal state, the sub power source 300 does not supply any power to the load 500, thus the overcurrent protection of the sub power source 300 is prevented from operating. In addition, the sub power source 300 is prevented from continuing to operate with its output in excess of the rated power.

Then, an operation in a case where the main power source 200-1, among the main power sources 200-1, 200-2, . . . 200-N, has failed is again explained with reference to FIG.

3A, FIG. 3B and FIG. 3C. As shown in FIG. 3A, in a case where the main power source 200-1 fails at time t2 after the power is turned on, the output voltage of the main power source 200-1 drops from V1 to 0. As shown in FIG. 3C, when the output voltage Vout1 of the main power source 200-1 drops to V3 at time t3, the diode 301-1 becomes conductive. As a result, the load 500-1 is supplied with power from the sub power source 300 instead of the failed main power source 200-1.

As described above, in the first embodiment, a potential difference is provided between the output voltage Vout1 of the main power source 200 and the output voltage Vout2 of the sub power source 300, and both of the main power source 200 and the sub power source 300 are connected by the diode 301. As a result, in a case where the main power source 200 is in the normal state, the sub power source 300 does not supply power to the load 500, and in a case where the main power source 200 fails, power is immediately supplied to the load 500 from the sub power source 300. As to the load 500-1, since there is no period during which power is not supplied to the same, the normal operation of the load 500-1 can be continued without stopping the operation of the electric equipment.

An exemplary voltage setting range of the sub power source 300 will be described. The sub power source 300 does not supply power to the load 500 in a case where the main power source 200 is in the normal state, while it needs to supply power to the load 500 in a case where the main power source 200 fails. Hereinafter, an exemplary configuration in which the output voltage of the main power source 200 is 24.5V±5% (23.275V to 25.725V), the minimum voltage at which the load 500 can operate is 20V, and a forward voltage drop of the diode 301 is 0.7V is described. An operation of the main power source 200 in this case in the normal state will be described. The minimum output voltage of the main power source 200 is 23.275V, and the voltage drop value of the diode 301 is 0.7V. Therefore, if the output voltage value of the sub power source 300 is less than the value obtained by adding the voltage drop value in the diode 301 to the minimum value of the output voltage of the main power source 200, the diode 301 will not be in the conductive state. Therefore, the output voltage of the sub power source 300 is set to less than 23.975V (23.275V+ 0.7V).

Since the minimum voltage at which the load 500 can operate is 20V, the output voltage of the sub power source 300 is determined so that a voltage equal to or more than the minimum voltage is supplied even after the voltage drop is applied. Therefore, if the output voltage of the sub power source 300 is equal to or more than (20V+0.7V)=20.7V, even in a case where the main power source 200 which supplies power to the load fails, the load 500 can be operated with the sub power source 300. Therefore, the output voltage V3 of the sub power source 300 in the steady state is set to equal to or more than 20.7 V, and equal to or less than 23.975 V. As a result, in a case where the main power source 200 has not failed, power is not supplied from the sub power source 300 to the load 500, and in a case where the main power source 200 has failed, power can be supplied from the sub power source 300 to the load 500.

The rated power of the sub power source 300 will be described. As to the rated power and the rated output power, the main power sources 200-1, 200-2, . . . 200-N need not have the same value. However, in order to backup the main power source, the value of the rated power of the sub power source 300 should be equal to or more than a value of the maximum output power of a power source which has the maximum output power while the electric equipment is operating, among the main power sources 200-1, 200-2, . . . 200-N. The first embodiment describes the operation in a case where one of a plurality of the main power sources 200-1, 200-2, . . . 200-N fails. However, by increasing the rated power of the sub power source 300, even in a case where a plurality of the main power sources 200-1, 200-2, . . . 200-N fail, it is possible to supply power from the sub power source 300.

Further, when the output voltage Vout1 of the main power source 200 becomes equal to or less than the value of V3 described above and the diode 301 conducts accordingly, switching from the main power source 200 to the sub power source 300 is automatically performed. Therefore, at this stage, a user and a serviceman of the power source apparatus 1000 or the electric equipment 2000 cannot recognize that the main power source 200 has failed.

On the other hand, in a case where one of the main power sources 200-1, 200-2, . . . 200-N has failed and power is supplied from the sub power source 300 to the load 500, another one of the main power sources 200-1, 200-2, . . . 200-N may fail. In a case where the rated power of the sub power source 300 is sufficiently large, the sub power source 300 may be able to backup a plurality of failed power supplies among the main power source 200. However, in other cases, in a case where a plurality of power supplies of the main power source 200 fail, the sub power source 300 cannot backup the failed power supplies. For this reason, in a case where at least one of the main power sources 200 fails, in order to prevent a situation in which the sub power source 300 cannot backup a plurality of power supplies, it is desirable to replace the failed main power source 200 with a normal product.

Therefore, the controller 700 of the electric equipment 2000 monitors the voltage detector 701 to determine whether the main power source 200 has failed or not, and in a case where it is determined that a failure has occurred, the determination result is notified by an arbitrary means. With reference to FIG. 3A, at time t3, the value of the output voltage Vout1 of the main power source 200-1 is V3, as described above. As shown in FIG. 3C, at time t3, the output voltage Vout1 of the main power source 200-1 drops to V3, therefore the diode 301 becomes conductive, and the output voltage Vout2 of the sub power source 300 is supplied to load 500-1. Therefore, for the load 500-1, voltage is supplied from the main power source 200-1 during a period of t0 to t2, and voltage is supplied from the sub power source 300 after the time t3.

During a period in which the voltage supply source is switched from the main power source 200 to the sub power source 300 (i.e., a period t2 to t3), the voltage Vload supplied to the load 500 decreases from V1 to V3. For this reason, in the first embodiment, a threshold value is previously set to the value of the voltage Vload. This threshold can be set, for example, in a range of less than V1 and more than or equal to V3. The controller 700 monitors the voltage value detected by the voltage detector 701. In a case where the detected voltage value drops from V1, which is the normal voltage value, to a predetermined threshold value or less, the controller 700 determines that the main power source 200 has failed, and notifies the user or the service man or the like of the determination result by an arbitrary means. Therefore, the controller 700 notifies the determination result by outputting a display control signal for displaying the determination result to the display 702, which serves as notification means. In particular, in the first embodiment, the determination result is notified to the user by displaying the occurrence of the failure and the information for identifying a load in which the failure has occurred in the display 702 of the electric equipment 2000. It should be noted that it is possible to perform the notification using the display 402 provided in the power source apparatus 1000. Further, it is possible to perform the notification by displaying the occurrence of a failure on a display of the serviceman's terminal through a communication line (not shown) or the like.

In this way, by detecting the voltage supplied from the load 500, it is possible to identify not only the failure of the main power source 200 but also the failure of the specific power source among the main power sources 200-1 to 200-N. Thereby it is possible to notify the identified result. Therefore, the time required for replacing the main power source 200 by the serviceman is shortened.

In the above description, the occurrence of a failure is notified by the controller 700 of the electric equipment 2000, the voltage detector 701, and the display 702. Similarly, the controller 400 of the power source apparatus 1000 monitors the voltage detector 401 to determine whether the main power source 200 has failed or not, and in a case where it is determined that a failure has occurred, it is possible to display the determination result on the display 402. Further, the controller 400 may notify the controller 700 of an occurrence of the failure, and the controller 700 may notify the occurrence of the failure using the display 702. Further, the controller 700 may notify the serviceman's terminal of the occurrence of the failure. In this way, by providing at least one of the power source apparatus 1000 and the electric equipment 2000 with a function for notifying the failure of the identified power source among the main power sources 200-1 to 200-N, it is possible to notify the user or the serviceman of the occurrence of the failure.

In the first embodiment, the case where the main power source 200-1 has failed is described, however, the main power source which can be backed up at the time of failure is not limited to the same. Even if at least one of the other main power sources 200-2, 200-3, . . . 200-N fails, it is possible to supply power to the load 500 from the sub power source 300 in the same manner.

Further, in the first embodiment, the AC/DC power source 100 is used as an example of the main power source 200 and the sub power source 300 of the power source apparatus 1000. However, the present disclosure applies to any DC power sources as well as a DC/DC power source which converts a DC voltage having a voltage value into a DC voltage of another voltage value. In a case where a DC/DC power source is used, it is possible to use the sub power source 300 to backup a failed main power source 200. As described above, according to the first embodiment, even if the main power source 200 fails, the main power source 200 can be backed up without stopping the power supply to the load 500.

Second Embodiment

In the first embodiment, a potential difference is provided between the output voltages of the main power source 200 and the sub power source 300 so that the diode 301 does not conduct in a case where the main power source 200 operates normally. Therefore, as to the sub power source 300, it is necessary to use an AC/DC power source which has a specification different from that of the main power source 200. Specifically, the values of the voltage detection resistors 109 and 110 in the sub power source 300 are different from the values of the voltage detection resistors 109 and 110 in the main power source 200.

Figure 4:
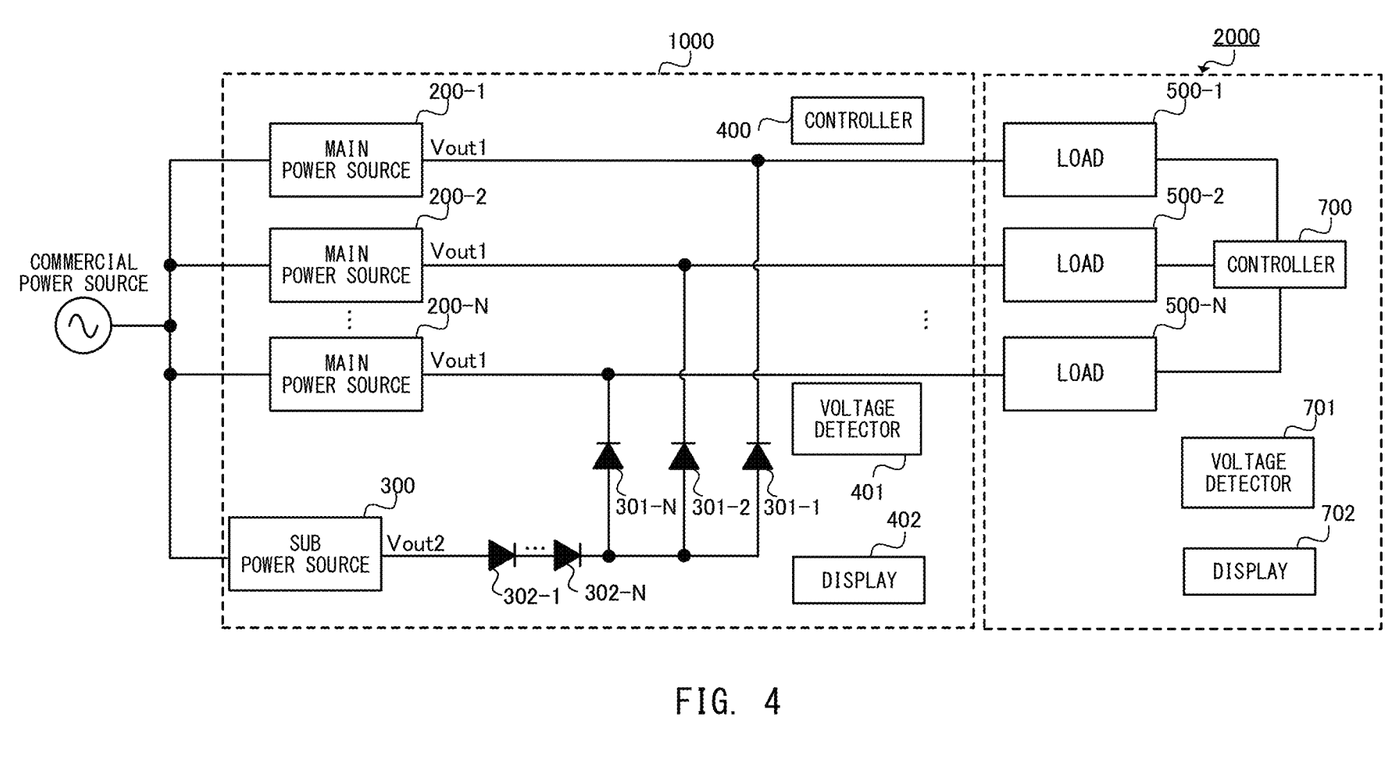
FIG. 4 is a schematic diagram of a power source apparatus and electric equipment according to a second embodiment.

In the second embodiment, the AC/DC power source 100 which has the same specification as the main power source 200 is used for the sub power source 300. FIG. 4 shows a configuration of the power source apparatus 1000 of the second embodiment. The power source apparatus 1000 shown in FIG. 4 has a plurality of the main power source 200, one sub power source 300, and a diode 301, which has the sub power source 300 and the main power source 200. Further, in the power source apparatus 1000 shown in FIG. 4, in addition to the configuration of the first embodiment, a plurality of diodes 302 (302-1, 302-2, . . . 302-N) for lowering the output voltage of the sub power source 300 and for connecting to the main power source 200. Unlike the first embodiment, in the second embodiment, each of the main power source 200 and the sub power source 300 has an AC/DC power source 100 having a common circuit configuration and a common target output voltage. Since the operation of the power source apparatus 1000 of the second embodiment is the same as the operation of the first embodiment, regardless of whether the main power source 200 is normal or faulty, a description thereof is omitted.

Hereinafter, the diode 302, which is added in the second embodiment will be described. In a case where the AC/DC power source 100 having a specification which is common to the main power source 200 and the sub power source 300 is used, the voltage Vout2 from the sub power source 300 drops due to the diode 301. Therefore, basically, the output voltage Vout2 of the sub power source 300 tends to be substantially less than the output voltage Vout1 of the main power source 200. However, since the output voltage varies depending on individual differences of the parts at the time of manufacturing each power source and other factors, in some cases, the output voltage Vout2 of the sub power source 300 may become more than the output voltage Vout1 of the main power source 200. In this case, the diode 301 becomes conductive even though the main power source 200 has not failed.

Therefore, in the second embodiment, in addition to the configuration of the first embodiment, a diode 302 (302-1, 302-2, . . . 302-N) is connected in series to the output of the sub power source 300 to thereby drop the output voltage. With this configuration, the diode 301 is prevented from conducting during normal operation of the main power source 200.

An example of the design of the diode 302 will be described. In this example, it is assumed that the output voltage values of the main power source 200 and the sub power source 300 are both 24.5V±5% (23.275V to 25.725V), the minimum voltage at which the load 500 can operate is 20V, and the voltage drop of each of the diodes 301 and 302 is 0.7V.

In the following description, the main power source 200 is normal, the output voltage of the main power source 200 is 23.275V, i.e., the minimum value in the variation range and the output voltage of the sub power source 300 is 25.275V, i.e., the maximum value in the variation range. Even in this case, by connecting one diode 301 and three diodes 302 in series, a voltage drop of 0.7V*4=2.8V occurs. Therefore, the voltage output from the diodes 301-1, 302-2, . . . and 302-N is 25.725V−2.8V=22.925V. Since the voltage value is lowered as described above, the diodes 301 and 302 do not conduct in a case where the main power source 200 is normal even if the variation in the output voltage of the sub power source 300 or the like is taken into consideration. Therefore, it is possible to prevent the output voltage Vout2 of the sub power source 300 from being supplied to the load 500 while the main power source 200 operates normally.

In the following, an example in which the main power source 200 fails is explained. Even if the output voltage of the sub power source 300 is 23.275V, i.e., the minimum value in the variation range, the voltage after the voltage drop due to the four diodes is 23.275V−2.8V=20.475V. This voltage value is more than the minimum voltage value (20V) at which the load 500 can operate. In this way, by connecting three diodes 302 to the output of the sub power source 300, the power is not supplied to the load 500 in a case where the main power source 200 has not failed, and the power is supplied to the load 500 in a case where the main power source 200 has failed.

As described above, by using the voltage drop due to the diode 302, the AC/DC power source 100 having the specification common to the main power source 200 and the sub power source 300 can be used. As a result, the design of the power source apparatus 1000 can be simplified, and the cost can be reduced by standardizing the parts.

In the second embodiment, as in the first embodiment, instead of the AC/DC power source 100, a DC/DC power source can be used as the main power source 200 and/or as the sub power source 300. Further, it is possible to detect a voltage value of the load 500 by the voltage detector 701 to determine whether or not a failure has occurred based on the detected voltage value. The determination result may be displayed on the display 702 or the like.

In the second embodiment, by providing the diode 302, the value of the output voltage Vout2 of the sub power source 300 is lowered by the voltage drop due to the diode 302. However, instead of the diode 302 as the voltage drop element for lowering the voltage, any type of resistance elements, such as a resistor, a variable resistor, and a light emitting diode for lowering the voltage can be used. For example, by using a variable resistor, the value of the variable resistor can be adjusted according to the variation in the voltage value due to individual differences during manufacturing, or according to a change in the output voltage from the sub power source 300 due to changes over time. It is possible to monitor the output voltage of the sub power source 300 detected by the voltage detector 401 by the controller 400. In this case, the value of the variable resistor can be changed according to the result of the monitoring. For example, when the output voltage of the sub power source 300 drops due to a change with time or the like, the controller 400 may change the value of the variable resistor to compensate the voltage drop. Further, when the light emitting diode is used, it is possible to visually determine whether or not the voltage is normally output from the sub power source 300. As described above, according to the present disclosure, there is provided a power source apparatus which has a plurality of power sources to continue to supply power to a load even if one of the power sources fails.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-229922, filed Dec. 20, 2019, which is hereby incorporated by reference herein in its entirety.

What is claimed is:

1. A power source apparatus comprising:
a first power source connected to a load, which is configured to operate at a voltage equal to or more than a first voltage, configured to output a second voltage that is higher than the first voltage to the load;
a second power source configured to output a third voltage that is higher than the first voltage, the second power source configured to supply power to the load in a case where the first power source is unable to output a predetermined voltage; and
a diode connected to the first power source and the second power source, an anode of the diode being connected to the output of the first power source, and a cathode of the diode being connected to the output of the second power source,
wherein a voltage output through the diode from the second power source is lower than the second voltage, thereby, when the voltage output from the first power source becomes lower than the voltage output through the diode from the second power source, the diode conducts and power is supplied from the second power source to the load.

2. The power source apparatus according to claim 1, wherein a value of the third voltage is a value obtained by adding a voltage drop value through the diode to the value of the second voltage.

3. The power source apparatus according to claim 1, wherein a slew rate, during a transition state in which the voltage output from the first power source reaches the second voltage, is set such that the voltage output from the first power source is more than the voltage output from the second power source.

4. The power source apparatus according to claim 1, wherein, upon activation of the power source apparatus, during a transition state in which the voltage of the first power source reaches the second voltage, the second power source is activated after activation of the first power source so that the voltage of the first power source is more than the voltage of the second power source.

5. The power source apparatus according to claim 1, wherein a rated power of the second power source is equal to or more than the output power of the first power source while the load operates.

6. The power source apparatus according to claim 1, wherein each of the first power source and the second power source is an AC/DC power source, which converts an AC voltage into a DC voltage, or is a DC/DC power source that converts a DC voltage into a different DC voltage.

7. The power source apparatus according to claim 1, further comprising a controller and a voltage detector configured to detect a voltage output from the first power source,
wherein the controller is configured to determine whether the first power source has failed or not based on a detection result of the voltage detected by the voltage detector, and to output, in a case where it is determined that the first power source has failed, a signal of notifying information representing that the first power source has failed.

8. The power source apparatus according to claim 1, further comprising:
a third power source connected to a second load, which is configured to operate at a voltage equal to or more than the first voltage, configured to supply the second voltage to the second load; and a second diode connected to the third power source and the second power source, an anode of the second diode being connected to the output of the third power source, and a cathode of the second diode being connected to the output of the second power source;

wherein a voltage output through the second diode from the second power source is lower than the second voltage, thereby, when the voltage output from the third power source becomes lower than the voltage output through the second diode from the second power source, the second diode conducts and power is supplied from the second power source to the second load.

9. A power source apparatus comprising:

a first power source connected to a load, which is configured to operate at a voltage equal to or more than a first voltage, configured to output a second voltage higher than the first voltage to the load;

a second power source configured to output the second voltage, the second power source being configured to supply power to the load in a case where the first power source is unable to output a predetermined voltage;

a diode connected to the first power source and the second power source, with an anode of the diode being connected to the output of the first power source, and with a cathode of the diode being connected to the output of the second power source; and a voltage drop element through which a voltage drop is connected in series between the second power source and the diode, wherein a voltage output through the diode and the voltage drop element from the second power source is lower than the second voltage, thereby, when the voltage output from the first power source becomes lower than the voltage output through the diode from the second power source, the diode conducts and power is supplied from the second power source to the load.

10. The power source apparatus according to claim 9, further comprising a controller and a detector configured to detect an output voltage of the second power source, wherein the voltage drop element is a variable resistor, and wherein the controller is configured to change a voltage of the variable resistor according to a voltage detected by the detector.

11. A system having a power source apparatus and electric equipment, which includes a plurality of loads, wherein the loads operate by power supplied from the power source apparatus, wherein the power source apparatus comprises:

a plurality of first power sources connected to the plurality of loads of the electric equipment through respective power supply lines; and at least one second power source as a sub power source, which is used in a case where at least one first power source of the plurality of first power sources is unable to output a predetermined voltage, wherein the second power source, which is provided on an anode side of a diode, is connected in parallel to the power supply line of at least one of the first power source through a diode, wherein at least one load of the plurality of loads is configured to operate at a voltage equal to or more than a first voltage, wherein the at least one first power source outputs a second voltage that is higher than the first voltage, wherein the second power source outputs a third voltage, which is higher than the first voltage, with a voltage output through the diode from the second power source being lower than the second voltage, thereby, in a case where the voltage output from the at least one first power source becomes lower than the voltage output through the diode from the second power source, the diode conducts and power is supplied from the second power source to the at least one load, and wherein the electric equipment comprises a controller and a detector configured to detect a voltage supplied to the at least one load, the controller is configured to determine whether the at least one first power source has failed or not based on a detection result of the voltage detected by the detector, and configured to notify, in a case where it is determined that the first power source has failed, information representing that the at least one first power source has failed.

12. The system according to claim 11, wherein the system is an image forming apparatus configured to form an image on a sheet, and the plurality of loads contains at least one of a motor and a high voltage generating circuit.

* * * * *